United States Patent
Roth

(10) Patent No.: US 6,178,500 B1
(45) Date of Patent: Jan. 23, 2001

(54) VECTOR PACKING AND SATURATION DETECTION IN THE VECTOR PERMUTE UNIT

(75) Inventor: Charles Philip Roth, Austin, TX (US)

(73) Assignee: International Business Machines Corporation, Armonk, NY (US)

(*) Notice: Under 35 U.S.C. 154(b), the term of this patent shall be extended for 0 days.

(21) Appl. No.: 09/104,653

(22) Filed: Jun. 25, 1998

(51) Int. Cl.[7] ........................................................ G06F 9/30
(52) U.S. Cl. ............................................................ 712/300
(58) Field of Search ................................... 712/200, 208, 712/300

(56) References Cited

U.S. PATENT DOCUMENTS

| | | | |
|---|---|---|---|
| 5,339,396 | * 8/1994 | Muramatsu et al. | 712/11 |
| 5,560,028 | * 9/1996 | Sachs | 712/23 |
| 5,794,003 | * 8/1998 | Sachs | 712/215 |
| 5,857,111 | * 1/1999 | Oda | 712/11 |
| 5,948,096 | * 9/1999 | Ginosar et al. | 712/210 |
| 5,978,899 | * 11/1999 | Ginosar et al. | 712/210 |

* cited by examiner

Primary Examiner—David Y. Eng
(74) Attorney, Agent, or Firm—Anthony V. S. England; Felsman, Bradley, Vaden, Gunter & Dillon, LLP

(57) ABSTRACT

A crossbar is implemented within multimedia facilities of a processor to perform vector permute operations, in which the bytes of a source operand are reordered in the target output. The crossbar is then reused for other instructions requiring multiplexing or shifting operations, particularly those in which the size of additional multiplexers or the size and delay of a barrel shifter is significant. A vector pack instruction with saturation detection, for example, may be performed with one cycle latency by the crossbar and a correction multiplexer for substituting saturated values. The crossbar facility thus gets reused with improved performance of the instructions now sharing the crossbar and a reduction in the total area required by a multimedia facility within a processor.

18 Claims, 4 Drawing Sheets

VECTOR PACKING AND SATURATION DETECTION IN THE VECTOR PERMUTE UNIT

RELATED APPLICATIONS

The present invention is related to the subject matter of commonly assigned, copending U.S. patent application Ser. No. 09/104,652 entitled "Fast Shift Amount Decode for VMX Shift and VPERM Instructions" and filed, Jun. 25, 1998 and Ser. No. 09/149,466 entitled "Wide Shifting in the Vector Permute Unit (VPU)" and filed, Sep. 8, 1998. The content of the above-referenced application is incorporated herein by reference.

BACKGROUND OF THE INVENTION

1. Technical Field

The present invention relates in general to consolidation of multimedia facilities and in particular to reusing existing circuitry for one multimedia instruction in place of comparable circuitry for other multimedia instructions. Still more particularly, the present invention relates to employing a crossbar within a vector permute unit for multiplexing functions required for other multimedia instructions.

2. Description of the Related Art

Multimedia applications are increasing, leading to an increased demand for multimedia facilities within processors. Processors, such as the PowerPC™ processor available from IBM Corporation of Armonk, N.Y., are increasingly incorporating such multimedia facilities. In the case of the PowerPC™, the multimedia facility is the vector multimedia extensions (VMX) facility.

Several of the instructions implemented by the VMX facility require a multiplexing function for at least one stage. For example, the traditional approach to implementing the vpack instruction, which compresses either 32 bits into 16 bits or 16 bits into 8 bits, would involve a multiplexer. An example is depicted in FIG. 3. A vpack instruction is received by decode logic 302, which generates selects for multiplexer 304 based on whether the operand 306 is being compressed from 16 bits to 8 bits or from 32 bits to 16 bits. Multiplexer 304 selects possible alternatives for the top target byte 308a from the bytes of 32 bit operand 306. Saturation multiplexers 310a and 310b, under the control of saturation detection logic 312, select between source bytes from operand 306 or their saturated values 314a and 314b for target bytes 308a and 308b. Multiplexer 304, in particular, requires a significant amount of area within the multimedia facility and may incur undesirable latency in instruction execution.

It would be desirable, therefore, to utilize existing hardware within the multimedia facilities of a processor to performing comparable multiplexing and shifting functions for other instructions. It would further be advantageous if the resulting mechanism reduced latencies for the instructions.

SUMMARY OF THE INVENTION

It is therefore one object of the present invention to provide a method and apparatus for consolidation of multimedia facilities.

It is another object of the present invention to provide a method and apparatus for reusing existing circuitry for one multimedia instruction in place of comparable circuitry for other multimedia instructions.

It is yet another object of the present invention to provide a method and apparatus for employing a crossbar within a vector permute unit for multiplexing functions required for other multimedia instructions.

The foregoing objects are achieved as is now described. A crossbar is implemented within multimedia facilities of a processor to perform vector permute operations, in which the bytes of a source operand are reordered in the target output. The crossbar is then reused for other instructions requiring multiplexing or shifting operations, particularly those in which the size of additional multiplexers or the size and delay of a barrel shifter is significant. A vector pack instruction with saturation detection, for example, may be performed with one cycle latency by the crossbar and a correction multiplexer for substituting saturated values. The crossbar facility thus gets reused with improved performance of the instructions now sharing the crossbar and a reduction in the total area required by a multimedia facility within a processor.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
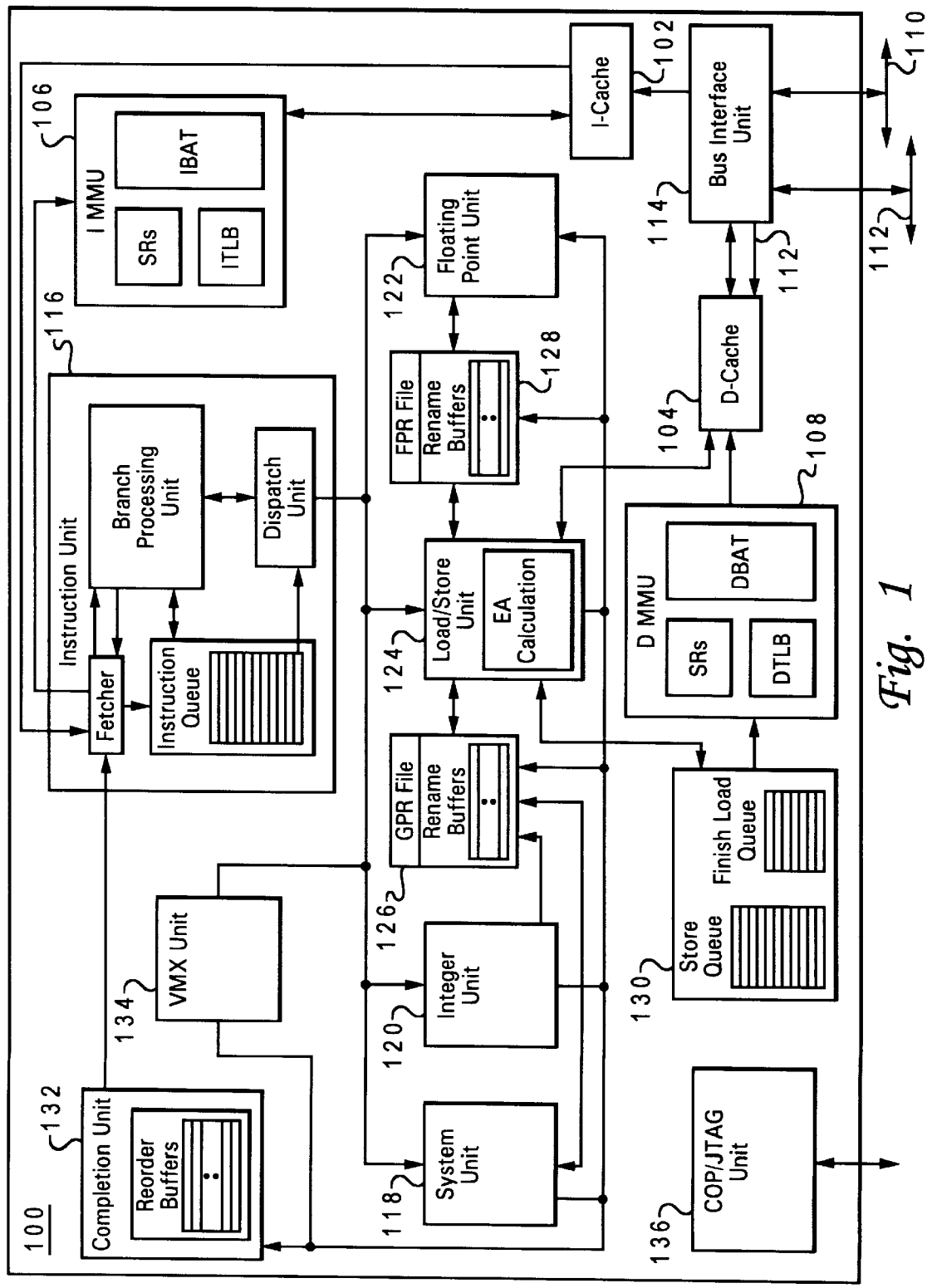
FIG. 1 depicts a block diagram of a processor and related portions of a data processing system in which a preferred embodiment of the present invention may be implemented.

With reference now to the figures, and in particular with reference to FIG. 1, a block diagram of a processor and related portions of a data processing system in which a preferred embodiment of the present invention may be implemented are depicted. Processor 100 is a single integrated circuit superscalar microprocessor, such as the PowerPC™ processor available from IBM Corporation of Armonk, N.Y. Accordingly, processor 100 includes various units, registers, buffers, memories, and other sections, all of which are formed by integrated circuitry. Processor 100 also operates according to reduced instruction set computing ("RISC") techniques.

Processor 100 includes level one (L1) instruction and data caches ("I Cache" and "D Cache") 102 and 104, respectively, each having an associated memory management unit ("I MMU" and "D MMU") 106 and 108. As shown in FIG. 1, processor 100 is connected to system address bus 110 and to system data bus 112 via bus interface unit 114. Instructions are retrieved from system memory (not shown) to processor 100 through bus interface unit 114 and are stored in instruction cache 102, while data retrieved through bus interface unit 114 is stored in data cache 104.

Instructions are fetched as needed from instruction cache 102 by instruction unit 116, which includes instruction fetch logic, instruction branch prediction logic, an instruction queue and a dispatch unit.

The dispatch unit within instruction unit 116 dispatches instructions as appropriate to executions units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128. VMX unit 134 performs byte reordering, packing, unpacking, and shifting, vector add, multiply, average, and compare, and other operations commonly required for multimedia applications.

Load/store unit 124 loads instruction operands from data cache 104 into integer or floating point registers 126 or 128 as needed, and stores instructions results when available from integer or floating point registers 126 or 128 into data cache 104. Load and store queues 130 are utilized for these transfers from data cache 104 to and from integer or floating point registers 126 or 128. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor ("COP") and joint test action group ("JTAG") unit 136 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 2A:
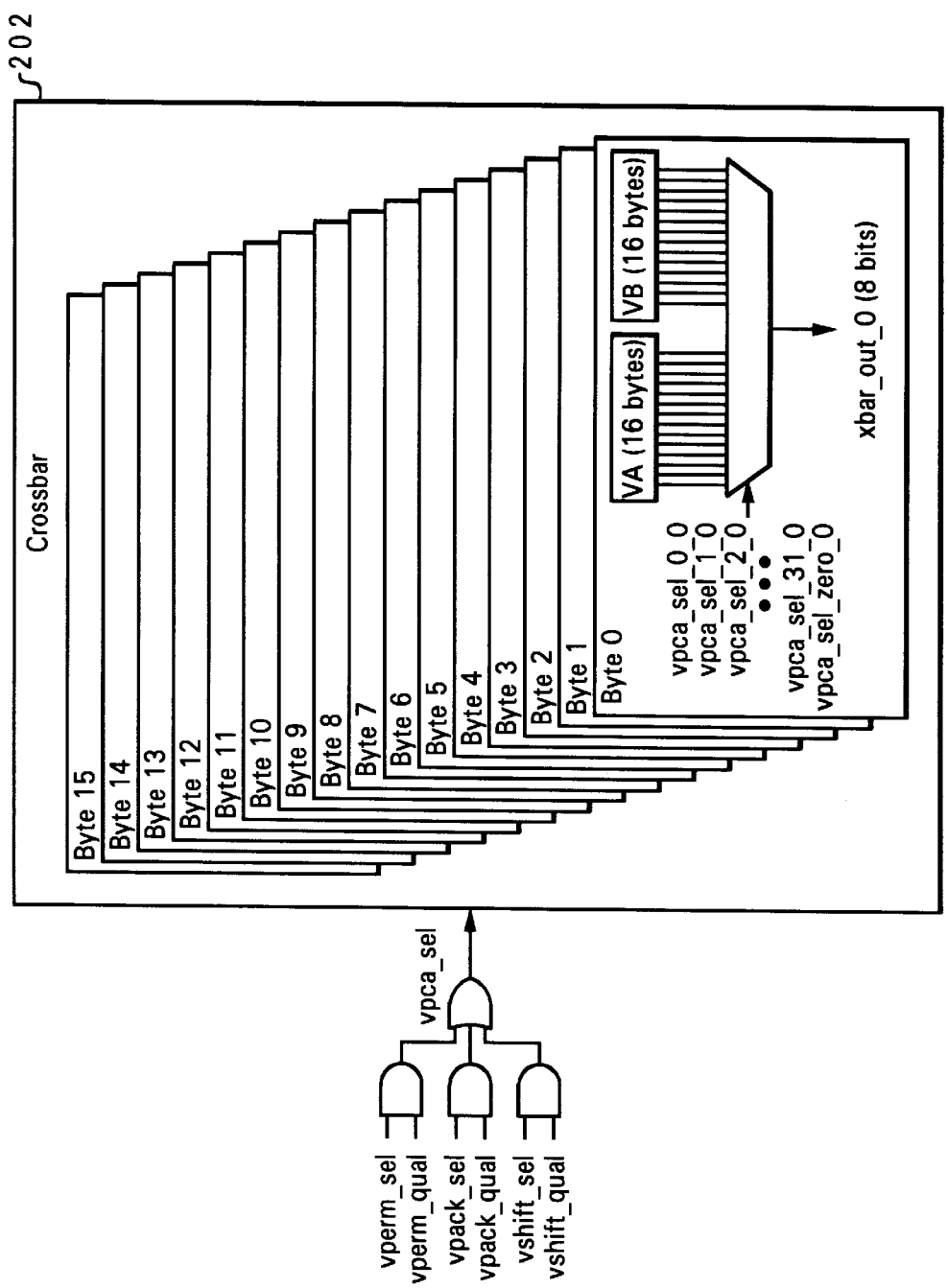
FIGS. 2A–2B are block diagrams of mechanisms for performing instructions requiring multiplexing or shifting function utilizing an existing crossbar within a processor multimedia facility in accordance with a preferred embodiment of the present invention.
Figure 2B:
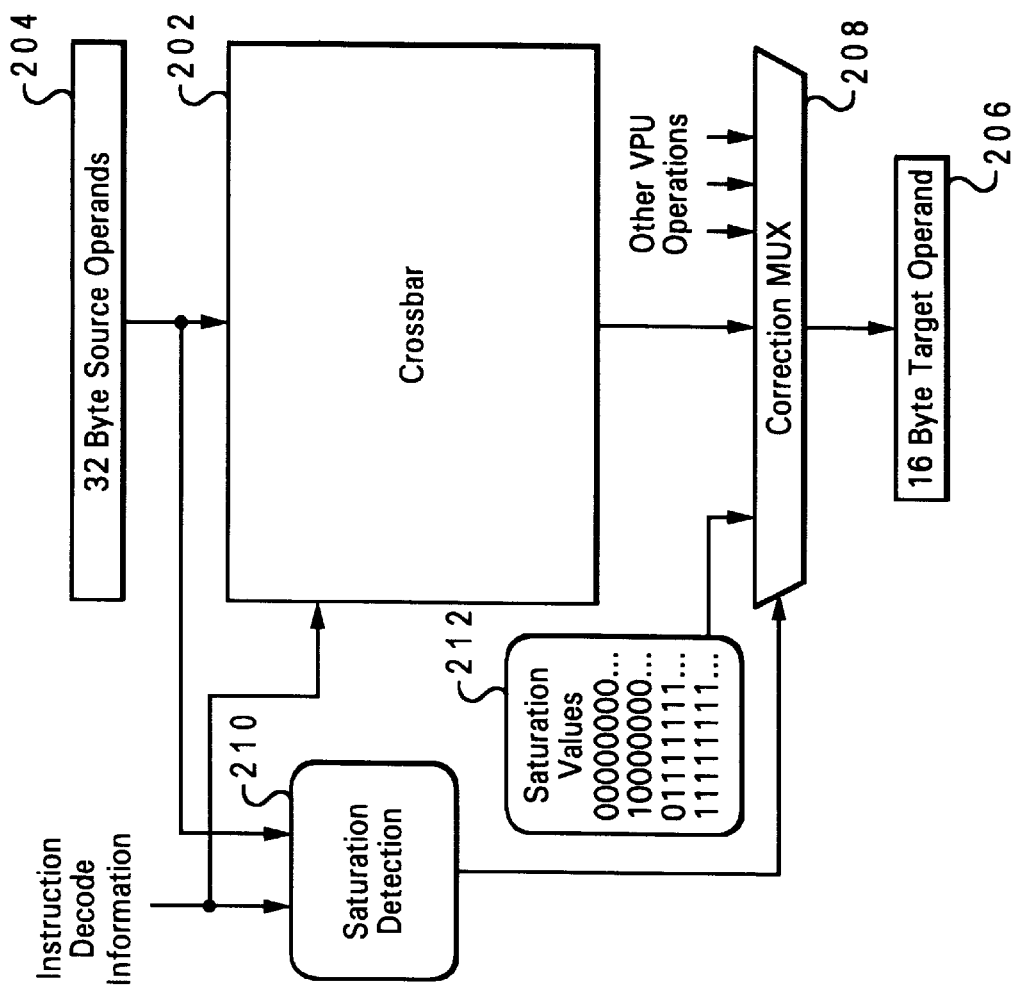

Referring now to FIGS. 2A–2B, block diagrams of mechanisms for performing instructions requiring multiplexing or shifting functions utilizing an existing crossbar within a processor multimedia facility in accordance with a preferred embodiment of the present invention are illustrated. FIG. 2A is a block diagram for a crossbar within the multimedia facilities of a processor, such as VMX unit 134 depicted in FIG. 1. One of the sub-units of the VMX multimedia processor engine is the vector permute unit (VPU). This unit is responsible for performing byte reordering, packing, unpacking, byte shifting, etc. In particular, this unit performs byte reordering for the VMX vperm (vector permute) instruction of the PowerPC™ architecture, which reorders bytes within a source operand VA or VB according to target designations within quadword operand VC.

At the core of the VPU is a 32:16 byte-wide crossbar 202, which can place any of 32 source bytes into any of 16 target byte positions. The current implementation of the crossbar network is a set of 16 33:1 byte-wide passgate multiplexers. Each 33:1 multiplexer is controlled by 32 selects which may select from any source byte of operands VA or VB to a common target byte and a "zero select" that is utilized to select zeros in the shift cases or in cases when the crossbar is not being utilized. FIG. 2A depicts a simple diagram of the crossbar showing the flow for target byte 0 of the crossbar output, which includes a 33:1 multiplexer capable of passing any byte of operands VA or VB to target byte 0 of the crossbar output. Multiplexer selects vpca_sel_0_0 through vpca_sel_31_0 are employed to select a byte from input operand VA or input operand VB to be passed to crossbar output xbar_out_0 for target byte 0. The mechanism shown for target byte 0 is replicated for target bytes 1 through 15. The selects for each multiplexer within crossbar 202 are of the form sel_X_Y, where X is the source byte and Y is the target byte. In the present invention, crossbar 202, implemented primarily for execution of the vperm instruction, is reused for vector pack and wide shift operations as described in further detail below. Accordingly, selects for each type of instruction must be qualified by signals verifying that the appropriate type of instruction is, in fact, being executed. With a potential fan out of 512 selects, qualification of the crossbar selects may pose a timing problem.

Figure 3:
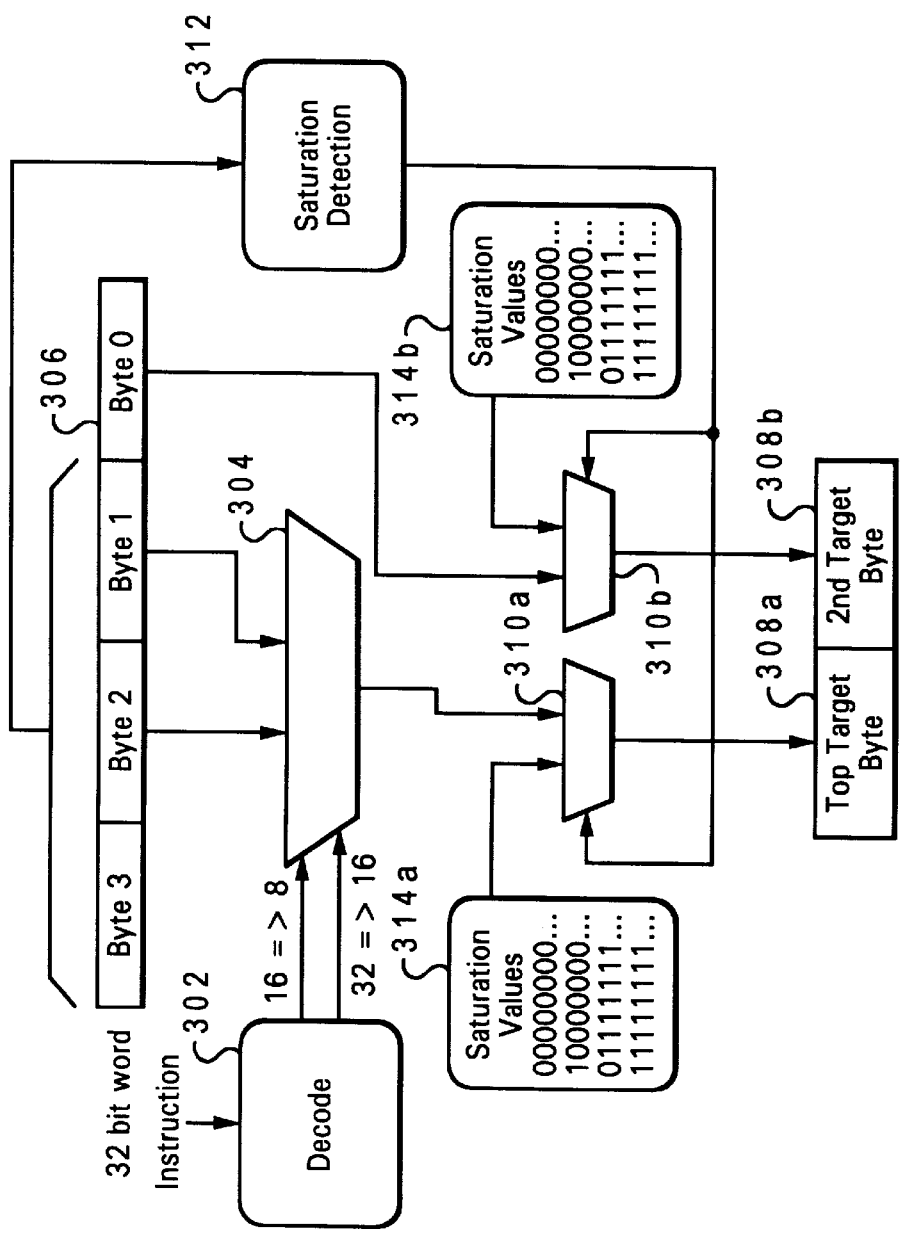
FIG. 3 depicts a block diagram of a circuit implementing a vector pack operation with saturation detection in accordance with the known art.

FIG. 2B is a block diagram for a circuit implementing a vector pack (vpack) instruction with saturation detection in accordance with a preferred embodiment of the present invention. In lieu of multiplexer 304 depicted in FIG. 3, crossbar 202 within the VPU is reused for the vpack instruction. By taking advantage of existing circuits, the VMX vpack instruction may be executed using crossbar 202. The vpack instruction reduces 32 or 16 bit numbers to 16 or 8 bits, respectively. In the PowerPC™ architecture, source operands may be signed or unsigned and the operation may be performed either modulo or saturated.

In the present invention, instruction decode information generated by decode logic (not shown) includes the selects for crossbar 202, decoded from the instruction type. These selects are employed to select the appropriate bytes from source operand 204 to be passed by crossbar 202 for the target bytes of target operand 206. A correction multiplexer 208 between the output of crossbar 202 and target operand 206, necessary for other VPU operations, may be employed by saturation detection logic 210 to substitute saturated values 212 for source bytes passed by crossbar 202 from source operand 204. No change in saturation detection logic 210 over the implementations known in the art is required. Saturation detection logic 210 utilizes the instruction decode information, which includes whether the instruction is signed/unsigned and saturated/modulo, to set the high-order bit of saturated values. Low order bits of saturated numbers, which will be all 0's or all 1's, are also selected by saturation detection logic 210 from the instruction decode information.

The selects for crossbar 202 may be logically ORed with other crossbar selects employed for other instructions such as the vperm instruction. Although crossbar 202 will have longer delays than multiplexer 304 depicted in FIG. 3, the traditional approach to implementing the vector pack instruction is limited by saturation detection logic 312 depicted in FIG. 3. Delays for crossbar 202 will not exceed delays for saturation detection logic 210, and thus cycle time will not be affected. Moreover, saturation detection logic 210 may operate in parallel with the dataflow through crossbar 202.

The present invention allows the vector pack operation to take advantage of existing hardware and, with minimal additional hardware, implement a 1 cycle latency and 1 cycle throughput vpack instruction with saturation detection. Reuse of the existing crossbar required to support other instructions reduces the total area required for a multimedia facility within a processor.

While the invention has been particularly shown and described with reference to a preferred embodiment, it will be understood by those skilled in the art that various changes in form and detail may be made therein without departing from the spirit and scope of the invention.

What is claimed is:

1. A mechanism for performing a portion of vector pack operations, comprising:

a crossbar passing any source byte from a vector pack instruction operand to any target byte within an output;

decode logic operating on a vector pack instruction and generating selects for the crossbar to perform movement of a source byte to a target byte;

a correction multiplexer selecting between an output of the crossbar and a saturated value for the target byte; and saturation detection logic generating selects for the correction multiplexer to select the crossbar output or the saturated value for the target byte.

2. The mechanism of claim 1, wherein the crossbar comprises a network of 16 multiplexers employed for vector permute operations.

3. The mechanism of claim 1, wherein the decode logic generates crossbar selects to select a first source byte for a top target byte.

4. The mechanism of claim 1, wherein the decode logic generates crossbar selects to select a first source byte for a top target byte and a second source byte for a second target byte.

5. The mechanism of claim 4, wherein the crossbar selects a second most significant byte from a source operand for the top target byte.

6. The mechanism of claim 4, wherein the crossbar selects a second least significant byte from a source operand for the top target byte.

7. The mechanism of claim 4, wherein the crossbar selects a least significant byte from a source operand for the second target byte.

8. The mechanism of claim 4, wherein the correction multiplexer selects a saturated value of a second most significant byte from a source operand for the top target byte.

9. The mechanism of claim 4, wherein the correction multiplexer selects a saturated value of a second least significant byte from a source operand for the top target byte.

10. The mechanism of claim 4, wherein the correction multiplexer selects a saturated value of a least significant byte from a source operand for the second target byte.

11. The mechanism of claim 1, wherein the correction multiplexer comprises a multiplexer employed for other vector permute unit operations.

12. The mechanism of claim 1, wherein a 32 bit to 16 bit vector pack operation is performed.

13. The mechanism of claim 1, wherein a 16 bit to 8 bit vector pack operation is performed.

14. A method for performing aportion of vector pack operations, comprising:

generating, from a vector pack instruction, selects for a crossbar passing any source byte from a vector pack instruction operand to any target byte within an output;

selecting a first source byte for a first target byte;

passing the selected source byte through the crossbar to an output;

selecting between the first source byte and a saturated value for the first source byte for the first target byte; and generating selects for a correction multiplexer connected to an output of the crossbar to select the first source byte or the saturated value for the source byte.

15. The method of claim 14, further comprising:

selecting a second source byte for a second target byte; and passing the second source byte through the crossbar to the output.

16. The method of claim 14, wherein the step of generating selects for a crossbar passing any source byte to any target byte further comprises:

generating selects for a network of 16 multiplexers employed for vector permute operations.

17. The method of claim 14, wherein a 32 bit to 16 bit vector pack operation is performed.

18. The method of claim 14, wherein a 16 bit to 8 bit vector pack operation is performed.

* * * * *